A. L. SAXON.
TRUCK BRAKE APPLIANCE.
APPLICATION FILED FEB. 19, 1910.
969,149.
Patented Aug. 30, 1910.
2 SHEETS—SHEET 2.
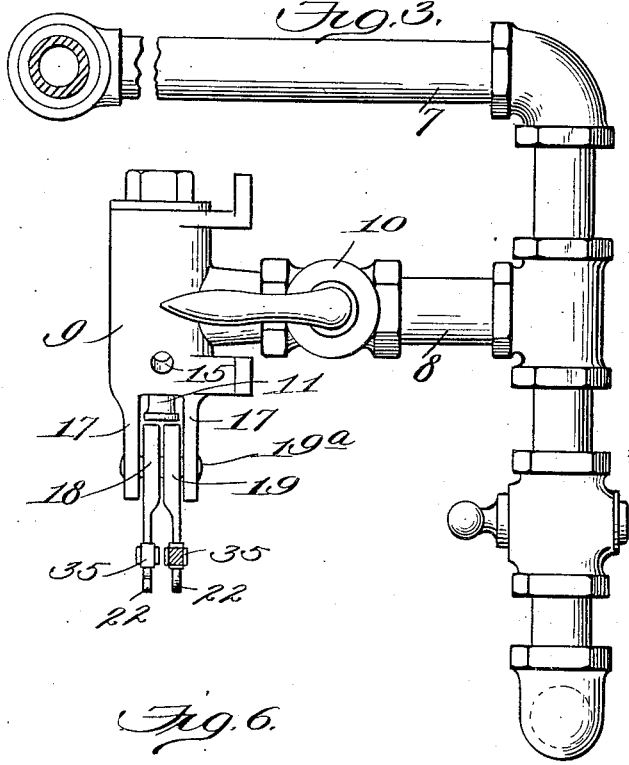
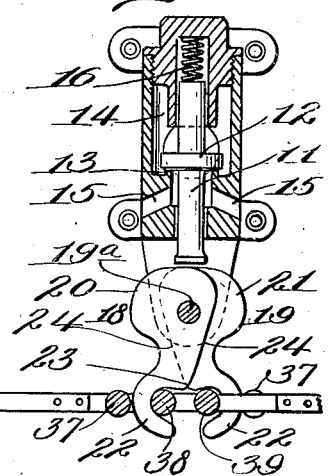
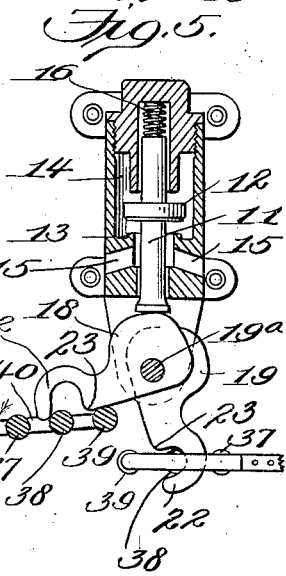
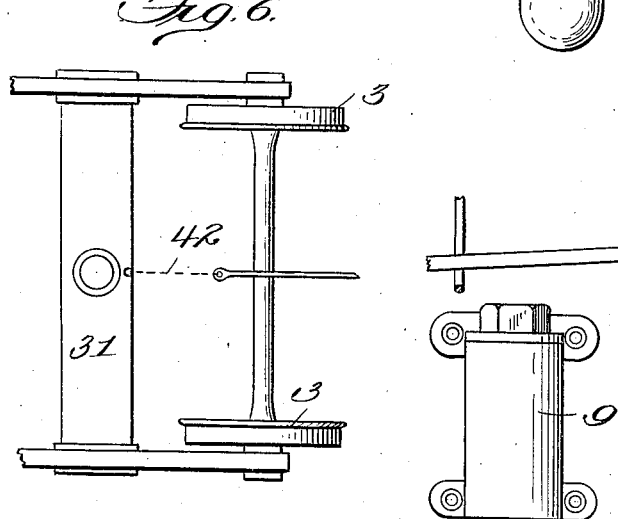
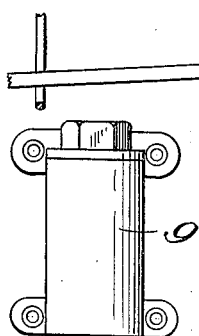
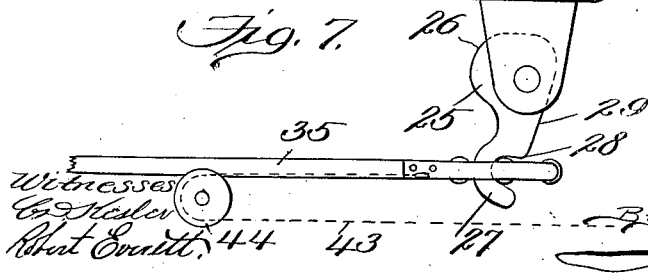
Inventor
Andrew L. Saxon
By James L. Norris
Atty.
Witnesses

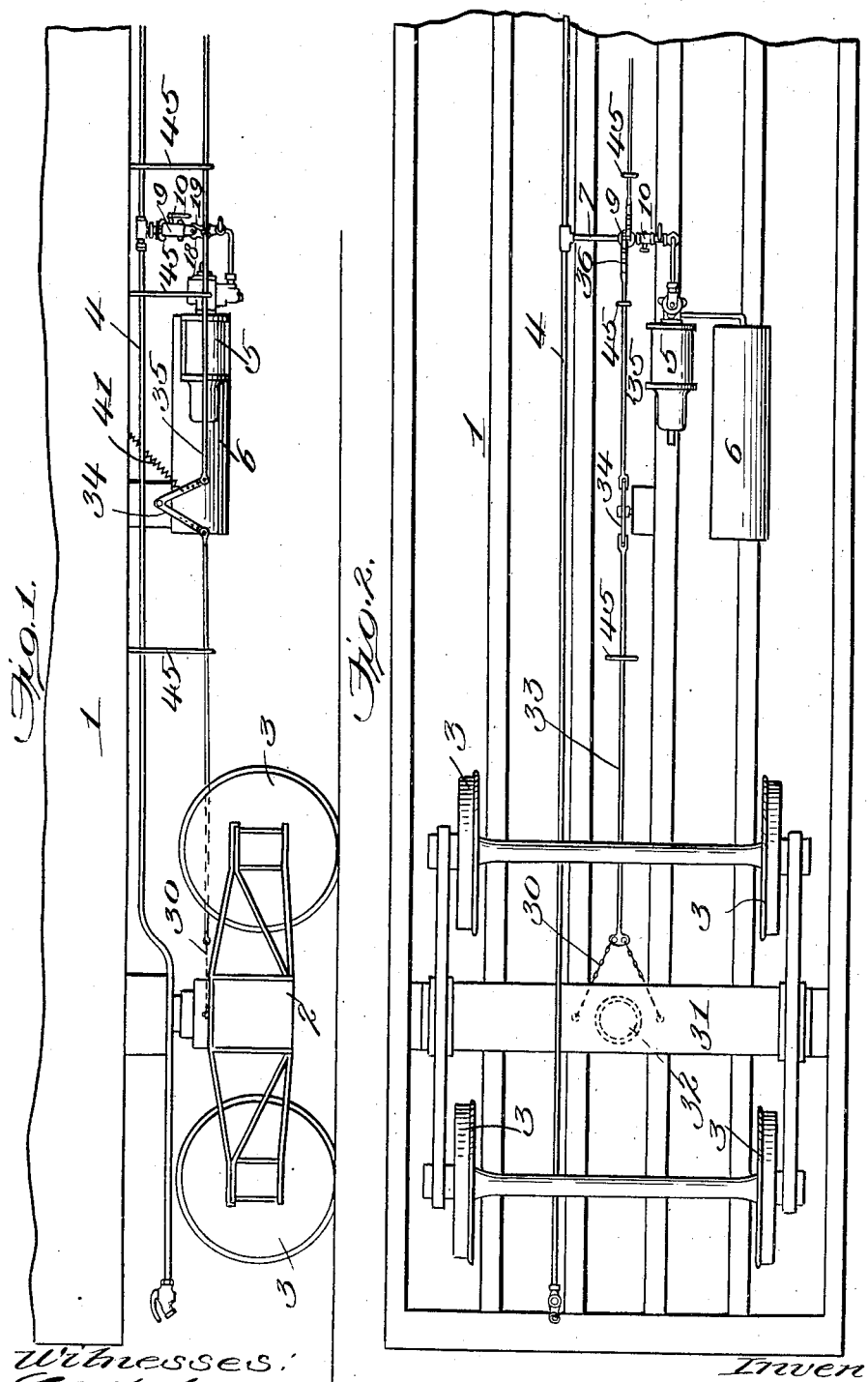

UNITED STATES PATENT OFFICE.

ANDREW L. SAXON, OF WHITFIELD, TEXAS.

TRUCK BRAKE APPLIANCE.

969,149.          Specification of Letters Patent.     Patented Aug. 30, 1910.

Application filed February 19, 1910. Serial No. 544,769.

*To all whom it may concern:*

Be it known that I, ANDREW L. SAXON, a citizen of the United States, residing at Whitfield, in the county of Briscoe and State of Texas, have invented new and useful Improvements in Truck Brake Appliances, of which the following is a specification.

This invention relates to an automatic truck brake appliance for railway cars, and consists essentially of improvements on the construction disclosed by my Letters Patent No. 853,122, granted May 7, 1907.

The object sought in the improved structure is in all respects similar to that evolved by the patented structure and contemplates means operatively associated with a railway car truck and any ordinary or preferred fluid pressure brake mechanism for causing the instant application of the brake shoes to the truck wheels when the truck assumes an abnormal position in relation to the car body as when the truck is shifted to an angle greater than that imparted thereto in traveling over maximum curves, or when one or more wheels of the truck leave or jump one or both rails of a track.

The primary object of the improved structure is to render the application of the fluid pressure brake mechanism to the wheels of a car truck, when the latter is abnormally disposed relatively to the car body, more positive and reliable by reducing the pressure in the train pipe, the brakes in the improved mechanism being applicable to the wheels of either one or both trucks of a car and automatically operating to establish a disconnection between the devices coöperating with the truck and a valve provided in connection with the brake mechanism to insure a wide-open condition of the valve and a consequent continuance of the application of the brake to set up a resistance to movement of the truck when the latter is in abnormal position.

The improved construction also embodies manually operative means for permitting the fluid pressure brake mechanism to operate as usual in relation to the wheels of the car trucks independently of the automatic appliance connected to and actuated by the truck.

One of the numerous advantages of the improved automatic truck brake appliance is that the usual form of fluid pressure brake mechanism remains in its normal condition and application or is not required to be modified to adapt the appliance thereto, such additions as are made to the train pipe being readily connected to the latter without in the least impairing the efficiency of the brake mechanism in the performance of its desired functions, and the appliance includes as an essential feature an additional valve disposed in convenient position for operation by the truck actuated devices. This additional valve may be of any preferred structure, and that form thereof illustrated in the drawings and hereinafter described is used simply as a means for demonstrating the practicability of the improved appliance. It will also be understood from the variations of the improved structure which will be explained, that it is intended to adopt any analogous instrumentalities having a similar function, and, furthermore, the exact positions of the parts subsequently specified are not essential and may be varied at will in accordance with the requirements of various applications, changes in the dimensions and proportions and variations in the details of construction being contemplated within the scope of the claims.

In the drawings: Figure 1 is a side elevation of a portion of a car showing a truck and the improved automatic brake appliance disposed in operative relation to and coöperating with the fluid pressure brake mechanism. Fig. 2 is a bottom plan view of the car as shown by Fig. 1. Fig. 3 is a detail view in elevation, partially in section, illustrating the manner of attaching the additional valve and operating mechanism to the fluid pressure brake mechanism and embodying a manually operative cut-out valve. Fig. 4 is a detail sectional view through the additional valve showing the eccentric actuating means and the association therewith of the devices connected to the truck, the several parts being in normal position. Fig. 5 is a view similar to Fig. 4 showing the valve open and the parts in corresponding positions or as having been operated by an abnormal position of one of the trucks. Fig. 6 is a top plan view of a portion of a truck showing a slight modification. Fig. 7 is a detail elevation of the additional valve and a part of the devices attached to the trucks showing a further modification.

Referring to the drawings, the numeral 1 designates a car bed or bottom provided with trucks 2, one only being shown, and provided with wheels 3. The air brake mechanism or organization includes as usual a train pipe 4, brake cylinder 5, and auxiliary reservoir 6 assembled and operating in a manner which will be readily understood. The car and trucks and the brake mechanism may be of any known or preferred construction and arrangement, the trucks being swiveled to the car body or so assembled in relation to the latter as to be capable of movement for obvious reasons.

A branch pipe 7 is coupled to the train pipe 4 and also connected to the brake cylinder 5, and at an intermediate point a pipe 8 is attached to the branch pipe 7 and has communication with and supports an additional or controlling valve 9 of any preferred construction, the said valve also being secured to a part of the bottom structure of the car body to rigidly and positively hold the same in operative position relatively to the devices coöperating therewith and embodying the features of the invention. In the pipe 8 between the pipe 7 and the valve 9 a manually-operative cut-off valve 10 is introduced for the purpose of shutting off communication of the valve 9 from the pipe 7 to permit the fluid pressure brake organization to be operated independently of the improved automatic truck brake appliance or devices in the event that it is desirable and necessary at any time to arrange the improved appliance in inoperative condition relatively to the fluid pressure brake mechanism.

As hereinbefore indicated, the valve 9 as shown is capable of variations in structure, or the invention is not limited or confined to the use of any specific form of valve, but for the purposes of practical demonstration of the invention the valve 9 as shown has a plunger or stem 11 projecting through the bottom thereof and provided at its inner end with a head 12 coöperating with a seat 13 to control communication between the interior of the valve casing, or the valve chamber 14 and lateral exhaust ports 15. The plunger or stem 11 works against the resistance of a spring 16 seated within the valve and engages a part of the said plunger or stem to insure an automatic closure of the head 12 against the seat 13 when pressure is relieved from the lower end of the plunger or stem. A bracket 17 depends from the lower end of the casing of the valve 9 and movably supports the release or unseating means for the plunger or stem 11 and its head 12. This releasing or unseating means is shown in two forms, Figs. 3, 4 and 5 illustrating the same as being of dual form, and Fig. 7 showing the same as of single form. As illustrated by Figs. 3, 4 and 5, the release or unseating means consists of two eccentrics 18 and 19 of duplicate construction and loosely movable on an axis 19$^a$, the eccentrics being in reverse positions relatively to each other but both having cams 20 and 21 directly beneath and positioned to contact with the lower end of the plunger or stem 11. The reverse position of the releasing or unseating means embodying the two eccentrics naturally results in a reverse direction of movement of the same, but with a similar resultant actuation of the plunger or stem 11 to unseat the head 12. One eccentric is freely operative without in the least affecting the other, and each has a depending engaging terminal 22 of hook form as shown, the degree of hook contour of the eccentric terminals being variable or not confined to any precise extent, it being only sufficient that they effectively serve to remain intact with operating means until a certain movement of each eccentric and its cam has ensued and which will be more fully hereinafter explained. The lower portion of each eccentric adjacent to its engaging terminal is provided with a releasing projection 23, the projections of the two eccentrics being normally in the position shown by Fig. 4. Continuing upwardly from each projection 23 is an outwardly inclined edge 24 which with the projection 23 contributes to the release of the engaging terminal 22 of each eccentric from its operating means when the eccentric has attained a certain position or when the head 12 has been unseated through the actuation of the plunger or stem 11 by the cam 20 or 21, and at the time that the engaging terminal 22 of either eccentric is released from its operating means the corresponding cam of the eccentric operated will be about in the position shown by Fig. 5 and hold the head 12 unseated and permit a release of air through the ports 15 and an application of the brakes, the eccentric when elevated in the manner shown by Fig. 5 being held in such position owing to the relation of the high part of the cam thereof relatively to and over the axis 19$^a$. In other words, the eccentric that is actuated and moved to bring the cam thereof with pressure against the lower end of the plunger or stem 11 is locked against accidental release with relation to the said plunger or stem and the brakes will thus remain applied to the truck wheels irrespective of jerking or jostling movements of the latter subsequent to derailment.

The contour and arrangement of the single releasing or unseating means as shown by Fig. 7 is an exact counterpart of one of the eccentrics shown by Figs. 4 and 5 and performs the same function, and for the purpose of distinction solely is indicated by the reference character 25 and has a cam 26, a lower engaging terminal 27, a release projection 28 and an outwardly inclined edge 29 continuing from said projection.

The operating means or devices for the releasing or unseating means as just explained, may be varied, and as shown by Figs. 1 and 2 comprises two chains or analogous flexible devices 30 attached to the top portion of the truck bolster 31 on opposite sides of the center-pin or post 32 and converged toward and attached to one end of a draw rod or bar 33, the said draw rod or bar having its opposite end adjustably connected to one arm of a bell-crank lever 34 movably attached to and depending from a portion of the car bed. To the remaining arm of the bell-crank lever a second or auxiliary draw rod or bar 35 is adjustably attached and at its opposite extremity is provided with a head 36 having cross-bars or members 37, 38 and 39, the cross-bars or members 37 and 38 being positioned inwardly from the free terminal of the rod or bar 35 and spaced, as clearly shown by Figs. 4 and 5, to provide a seat or slot 40 to normally engage the terminal 22 of one of the eccentrics 18 or 19 in accordance with the truck of the car to which the said draw or pull devices are directly connected. The cross-bar or member 39 is located at the free terminal of the draw rod or bar and serves to engage the projection 23 and come in contact with the inclined edge 24 to clear the engaging terminal 22 from the slot 40 when the eccentric that is actuated reaches a certain elevation for purposes hereinbefore explained. The draw rods or bars 33 and 35 are similarly arranged in connection with each truck and the inner ends or free extremities of the rods or bars 35 individually coöperate with and engage the terminals 22 of the respective eccentrics 18 and 19 so that no matter which truck of a car assumes an abnormal position or is derailed, the plunger or stem 11 will be operated and the head 12 unseated to cause a release of the air from the train pipe and an escape through the ports 15 to set the brakes in connection with the abnormally positioned truck as well as the remaining truck that may be in normal position on the rails. It is also possible that both trucks may be disposed in abnormal positions or become derailed, and in such an event both eccentrics would be actuated without interference one with the other and apply pressure to the plunger or stem 11 and unseat the head 12. The movement of the bars or rods 33 and 35 may be regulated as desired and found necessary, or the strokes thereof lengthened or shortened relatively to the motion required to render the releasing and unseating means sensitive in its operation, by shifting the ends of said rods or bars relatively to the bell-crank lever 34, and as an assistance in returning the parts to normal position after the truck that has been abnormally disposed has been normally positioned, a spring 41 is attached to the one arm of the bell-crank lever and to an adjacent portion of the bed of the car body, as clearly shown by Fig. 1. It is possible also to obtain a similar operation of the draw rods or bars by attaching the rear end of each draw rod or bar 33 by a flexible connection 42 to the center of the upper portion of the bolster truck 31 in advance of the center-pin or post 32 as shown by Fig. 6, and correspondingly adjusting the end of the rod or bar engaging the bell-crank lever 34 so as to insure sufficient movement of the eccentric controlled by each draw rod or bar in its modified application. In this instance the draw rods or bars 35 will be used and also adjusted if found necessary. In some instances the draw rods or bars 33 might be directly attached to the car truck bolster, the only advantage in using the flexible connecting means as 30 and 42 being to compensate for the slight rocking or swerving movement of the truck in ordinary travel over rails and in traversing curves.

The pull means in connection with the single form of eccentric or releasing or unseating means as shown by Fig. 7, is the same with relation to one truck as hereinbefore explained, but differs in relation to the remaining truck, the latter having a chain or analogous flexible means 43 suitably attached thereto and carried rearwardly and trained over a sheave or pulley 44 supported in any preferred manner from the car bed, and the said chain or analogous flexible means is then carried forward a short distance and secured to the auxiliary draw rod or bar 35 so that the eccentric 25 will always be moved in the same direction irrespective of which truck will become abnormally disposed or derailed or in the event that both trucks are abnormally disposed. The draw rods or bars are held against falling below a predetermined plane by hangers 45 secured to and depending from the car bed or body, and by this means the several operating parts of the improved structure are always maintained in operative position.

The operation of the improved appliance will be understood from the foregoing description, and as a summary it may be briefly stated that the abnormal disposition or derailment of either truck of a car will result in a drawing action on the rods or bars 33 and 35 or on the chain or other flexible device 43, as the case may be, and the engaging terminal 22 of the eccentric, together with the latter, will be elevated and a clearance of the said terminal from the slot or seat 40 of the rod or bar 35 will ensue after the eccentric has been raised to a certain position or is swung on the axis 19ᵃ and when the cam of the actuated eccentric assumes a locking position relatively to the lower end of the plunger or stem 11 to hold the head 12 unseated. When the eccentric has been elevated to and assumed a locked position, the rod or bar 35 will fall to normal position, as indicated by the arrow in Fig. 5, or from the slight elevation thereof above a horizontal plane due to its following up or upward movement with the eccentric owing to the engagement of the terminal 22 with the slot or seat 40 and which upward movement will continue until a release of the terminal 22 has been effected by the cross-bar or member 39. When the truck has been restored to normal position and the several parts are also redisposed in normal operative position, the engaging terminal of the actuated eccentric will be again caused to enter the slot 40. The release of the terminal of either eccentric from the pull or draw means coöperating therewith prevents breakage of the eccentric that might ensue by continued engagement of the lower terminal thereof with the pull or draw means, particularly when the abnormally positioned or derailed truck was subjected to a jolting or slight traveling movement after its normal disposition or derailment. When the improved appliance is reset, the plunger or stem 11 and head 12 will return to normal position and the air brakes will be restored for ordinary braking operations or similar release actuation by the appliance. The pull devices connected to the trucks and operating the single valve organization normally have such arrangement as to length and tension that the brakes will be applied by opening the train line as soon as the flanges of the wheels of either truck move upwardly onto the balls of the rails of the track, and by this means the brakes will be expeditiously applied and to a material extent check the irregular movement of the trucks or at least set up such resistance against the movement of the trucks as to obstruct the same in irregularly traveling away from the rails in derailed positions.

What is claimed is:

1. A truck brake appliance comprising the combination with a train pipe, of a valve mechanism communicating with said pipe and operative to open the latter to the atmosphere, and a single valve unseating organization for opening the said valve mechanism and directly connected to the frames of both trucks of a car and operable by either one or both of the trucks to open the valve mechanism to the atmosphere.

2. The combination with a train pipe and car trucks, of a single valve mechanism operatively associated with both trucks and the train pipe to establish communication of the valve mechanism with the atmosphere, and a single valve unseating organization connected to both trucks and comprising reversely operating eccentrically disposed devices connected to the trucks for opening the valve mechanism, either one or both of the trucks when derailed actuating the single unseating organization to open the valve mechanism to the atmosphere.

3. In an apparatus of the class described, a train pipe opening valve to establish communication of the train pipe with the atmosphere, and a single unseating organization for the valve having means for operating the valve connected to the frames of both trucks of the car and actuated by either one or both of said trucks.

4. In an apparatus of the class described, a single train pipe opening valve arranged on each car to establish communication of the train pipe with the atmosphere, a valve actuating mechanism arranged for operation by one or both car trucks, and independent connections between different parts of the valve actuating mechanism and the frames of the two trucks for directly operating the said valve actuating mechanism when either one or both of the trucks are disposed irregularly relatively to the track rails.

5. In an apparatus of the class described, a single train pipe opening valve on each car to establish communication of the train pipe with the atmosphere, a single valve operating organization associated with said train pipe opening valve, and operating connections extending from said single valve operating organization to the frames of the car trucks and arranged to actuate the valve operating organization either independently or conjointly in accordance with the irregular position of one or both trucks relatively to the track rails.

6. The combination with a train pipe having a valve for opening the same to the atmosphere and car trucks, of a single valve unseating organization for each pair of trucks and operatively associated with the said train pipe valve, the said unseating valve organization comprising a pair of reversely arranged independently operable eccentrics to engage a portion of said valve to open the latter, and connections attached to the eccentrics and extending away from the latter in opposite directions and secured to the car trucks for operating either one or both of the eccentrics in accordance with the irregular position of either one or both of the car trucks relatively to the rails, a cut-out device between the train pipe and valve being provided to permit the train pipe to have normal operation independently of the truck controlled mechanism.

7. The combination with a train pipe and car trucks, of valve mechanism operatively associated with the train pipe to establish communication between said pipe and the atmosphere, unseating means consisting of reversely arranged independent operable devices to engage a portion of the valve mechanism and open the valve, and shifting means connected to the car trucks and engaging parts of the said devices to move the latter a predetermined distance to cause the valve mechanism to remain open, the shifting means being automatically separable from the said devices.

In testimony whereof I have hereunto set my hand in presence of two subscribing witnesses.

ANDREW L. SAXON.

Witnesses:
 JAMES L. NORRIS, Jr.,
 CHAS. S. HYER.